(12) United States Patent
Karaba

(10) Patent No.: US 7,040,441 B1
(45) Date of Patent: May 9, 2006

(54) MOTORIZED VEHICLE AND MANUFACTURING METHODS THEREFOR

(76) Inventor: Andy Karaba, 6032 N. 31st Dr., Phoenix, AZ (US) 85017-1508

( * ) Notice: Subject to any disclaimer, the term of this patent is extended or adjusted under 35 U.S.C. 154(b) by 72 days.

(21) Appl. No.: 10/389,490

(22) Filed: Mar. 14, 2003

Related U.S. Application Data

(60) Provisional application No. 60/364,932, filed on Mar. 14, 2002.

(51) Int. Cl.
*B62K 11/02* (2006.01)

(52) U.S. Cl. ............................. 180/207; 180/205
(58) Field of Classification Search ............. 180/205, 180/207
See application file for complete search history.

(56) References Cited

U.S. PATENT DOCUMENTS

| | | | | |
|---|---|---|---|---|
| 1,097,546 A | * | 5/1914 | Harley | 192/217.1 |
| 1,308,022 A | * | 7/1919 | Christensen | 180/219 |
| 2,331,976 A | * | 10/1943 | Hare | 180/16 |
| 2,468,367 A | * | 4/1949 | Holderness | 180/230 |
| 2,560,991 A | * | 7/1951 | Schuricht | 474/69 |
| 2,633,030 A | * | 3/1953 | Colden | 474/88 |
| 3,759,339 A | * | 9/1973 | Farrow | 180/216 |
| 4,397,369 A | * | 8/1983 | Read | 180/205 |
| 6,412,800 B1 | * | 7/2002 | Tommei | 280/220 |
| 6,571,899 B1 | * | 6/2003 | Simons | 180/205 |
| 2002/0084128 A1 | * | 7/2002 | Spanski | 180/205 |

* cited by examiner

*Primary Examiner*—Lesley D. Morris
*Assistant Examiner*—Matthew Luby
(74) *Attorney, Agent, or Firm*—Parsons & Goltry; Michael W. Goltry; Robert A. Parsons

(57) ABSTRACT

Disclosed is a vehicle consisting of a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly. An engine having a drive element is attached to the frame between the front fork and rear forks. A drive gear assembly is attached to the frame, a second endless chain couples the drive element to the drive gear assembly, and a third endless chain couples the drive gear assembly to the chain ring assembly.

7 Claims, 2 Drawing Sheets

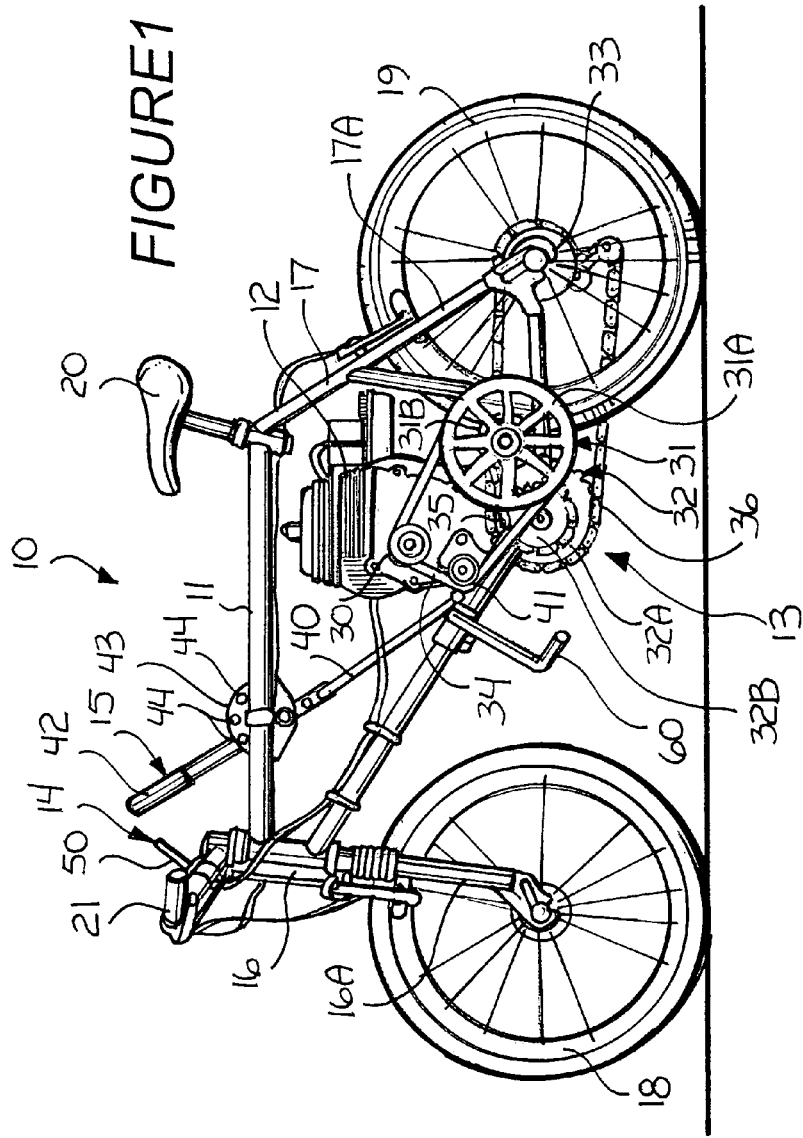

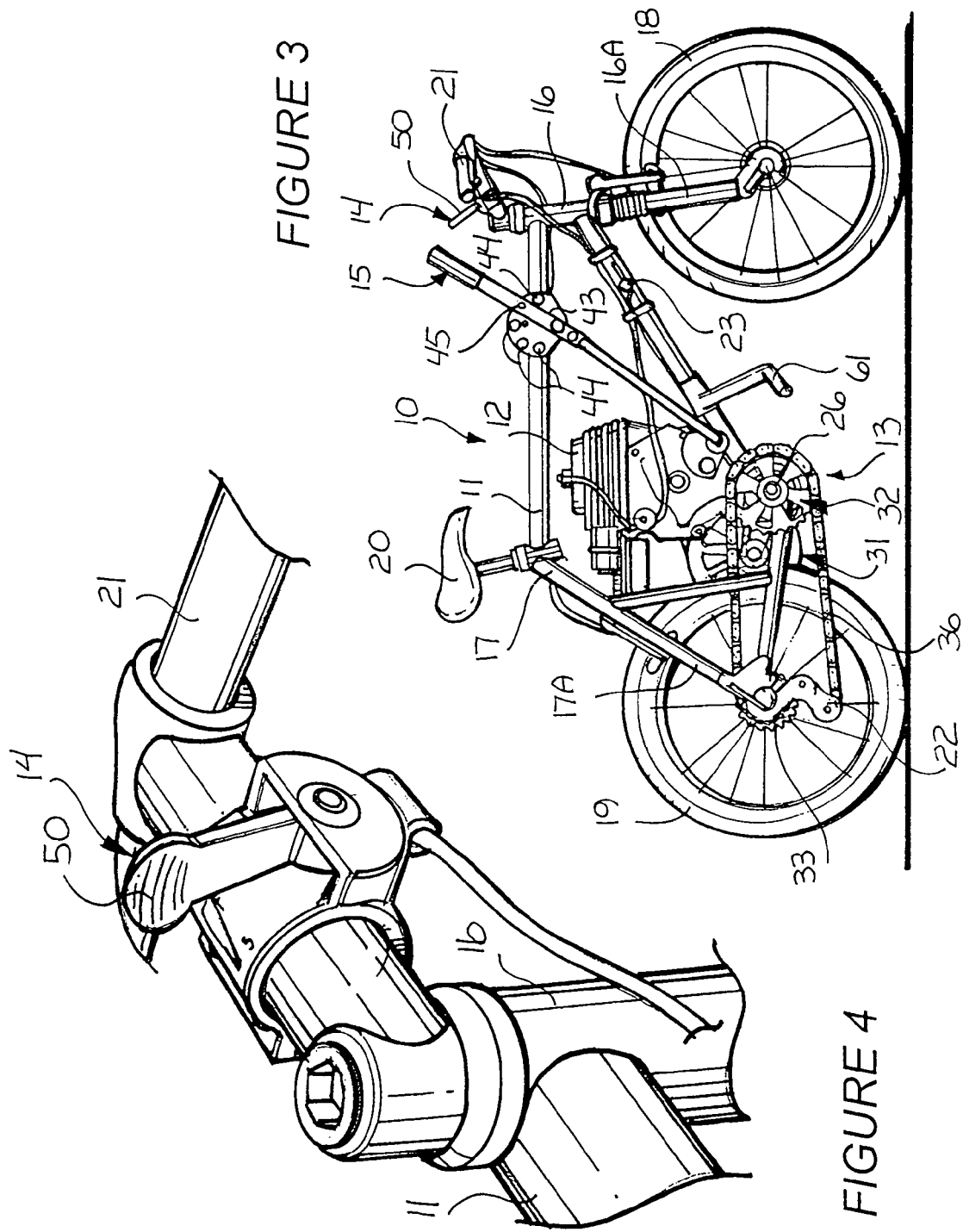

MOTORIZED VEHICLE AND MANUFACTURING METHODS THEREFOR

CROSS-REFERENCE TO RELATED APPLICATIONS

This application claims the benefit of U.S. Provisional Application Ser. No. 60/364,932, filed Mar. 14, 2002.

FIELD OF THE INVENTION

This invention relates to motorized vehicles and to methods of manufacturing motorized vehicles.

BACKGROUND OF THE INVENTION

Among all outdoor activities cycling is one of the most popular, especially road and mountain biking. For many, mountain biking is the most fun because mountain paths, desert trails, and country roads offer resplendent views of nature, fresh air, and respite from vehicular traffic. Structurally mountain bikes are considerably rugged and built to withstand hard, intense use over rugged terrain. Because mountain paths and nature trails are often quite hilly, mountain bikes are furnished with drive trains that offer a wide range of gearing ratios from very low gearing for climbing and high gearing for flat terrain.

Of great concern now is the preservation of natural resources, such as water and especially fuel oils. Although sport-utility vehicles and trucks and other large passenger vehicles were once popular and in high demand, they consume large amounts of fuel as a result are becoming increasingly less popular. Because people are becoming increasingly energy conscious, efforts to find convenient and energy-efficient transportation are now on the rise. Although motorcycles, small passenger vehicles, hybrid vehicles, and electric vehicles offer excellent energy-efficient modes of transportation, the technology and efficiency of bicycles and especially mountain bikes has remained ignored in terms of providing a baseline structure for a motorized vehicle.

SUMMARY OF THE INVENTION

Briefly, to achieve the desired objects and advantages of the invention while overcoming deficiencies in the art, an exemplary embodiment of the invention consists of a vehicle including a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly. An engine attached to the frame between the front fork and rear forks. The engine has a drive element and a power output. A drive gear assembly is attached to the frame, a second endless chain couples the drive element to the drive gear assembly, and a third endless chain couples the drive gear assembly to the chain ring assembly. A rear derailer is attached to the frame and associates with the cog assembly and the first endless chain, and a shift lever assembly is attached to the frame and is coupled to the rear derailer and is operative for adjusting the rear derailer for moving the first endless chain between gears of the cog assembly. A clutch is provided for connecting and disconnecting the drive element to the drive gear assembly, and a throttle is provided for controlling the power output of the engine.

Another embodiment of the invention is a vehicle consisting of a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly. A rear derailer is attached to the frame and associates with the rear cog assembly and the first endless chain. A shift lever assembly is attached to the frame and is coupled to the rear derailer, and is operative for adjusting the rear derailer for moving the first endless chain between gears of the cog assembly. Further to this embodiment is an engine, which is attached to the frame between the front fork and rear forks. The engine has a drive element and a power output. A drive gear assembly is attached to the frame, a second endless chain couples the drive element to the drive gear assembly, and a third endless chain couples the drive gear assembly to the chain ring assembly. Still further to this embodiment are a clutch for connecting and disconnecting the drive element to the drive gear assembly, and a throttle for controlling the power output of the engine.

A further embodiment of the invention is a vehicle consisting of a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly. An engine attached to the frame between the front fork and rear forks. The engine has a drive element and a power output. A drive gear assembly is attached to the frame, a second endless chain couples the drive element to the drive gear assembly, and a third endless chain couples the drive gear assembly to the chain ring assembly. A clutch is provided for connecting and disconnecting the drive element to the drive gear assembly, as is a throttle for controlling the power output of the engine. Further to this embodiment are a rear derailer attached to the frame and associated with the cog assembly and the first endless chain, and a shift lever assembly attached to the frame and coupled to the rear derailer for adjusting the rear derailer for moving the first endless chain between gears of the cog assembly.

Consistent with the foregoing of various exemplary embodiments of the invention and the ensuing detailed description, which are taken together, the invention also contemplates associated vehicle and vehicle manufacturing method embodiments.

BRIEF DESCRIPTION OF THE DRAWINGS

Referring to the drawings:

FIG. 1 is a left side elevation of a motorized vehicle constructed in accordance with the teachings of the invention, the vehicle including a bike having an attached drive train and an attached engine for driving the drive train, in which the engine is furnished with a throttle and a clutch;

FIG. 2 is a front elevation of the vehicle of FIG. 1;

FIG. 3 is right side elevation of the vehicle of FIG. 1; and

FIG. 4 is an enlarged perspective view of the throttle first illustrated in FIG. 1.

DETAILED DESCRIPTION OF A PREFERRED EMBODIMENT

Turning now to the drawings, in which like reference characters indicate corresponding elements throughout the several views, attention is first directed to FIG. 1 in which is seen a motorized vehicle, embodying the principle of the instant invention, generally indicated by the reference character 10 including a frame 11 having an attached engine 12, drive train 13, throttle 14 and clutch 15. Frame 11 is a bicycle frame. Although the invention can be facilitated with any bicycle frame, frame 11 is preferably a mountain bike frame. Frame 11 is considerably rugged and constructed of steel, aluminum, titanium, carbon fiber or any combination thereof or other suitable material or combination of materials, and includes front and rear ends 16, 17 characterized by front and rear forks 16A, 17A, respectively. A front wheel 18 is attached to front fork 16A in a conventional manner, and a rear wheel 19 is attached to rear fork 17A in a conventional manner.

Drive train 13 offers a wide range of gearing ratios from very low gearing for climbing and high gearing for flat terrain. Drive train 13 is constructed and arranged and attached to frame 11 in a conventional manner, and consists of crank 26 attached and rotated to frame 11 in a conventional manner, a front gear or chain ring assembly 32 attached to crank 26, and a rear gear or cog assembly 33 attached to the hub of rear wheel 19. A rear derailer 22 is attached to frame 11 in a conventional manner and associates with cog assembly 33, and an endless chain/belt 36 couples chain ring assembly 32 to cog assembly 33. Frame 11 supports an attached shift lever assembly 23 (FIG. 3) that is coupled in a conventional manner, such as with a wire (not shown), to rear derailer 22 through which chain 36 passes. Shift lever assembly 23 is operative for adjusting rear derailer 22 for moving chain 36 between gears/cogs of cog assembly 33. Shift lever assembly 23 is constructed in arranged in a conventional manner, the details of which will readily occur to the skilled artisan and will not be further discussed. A pair of differently sized fixed gears 32A, 32B characterize chain ring assembly 32, although three or more can be employed, if desired. Frame 11 constitutes the main support structure of vehicle 10 to which the various components of the invention are attached or otherwise supported. Attached to frame 11 is a seat 20 disposed toward rear end 17 and handlebars 21 disposed toward front end 16. Frame 11 can incorporates one or more other features commonly found on conventional mountain bikes, namely, shock absorbers, brakes, etc., further details of which will readily occur to the skilled artisan and will not be further discussed.

Engine 12 is a conventional internal combustion engine, such as a two horsepower Briggs & Straton internal combustion engine. Any suitable internal combustion engine can be used with the invention without limitation and at any suitable or desired horsepower consistent with the teachings of the invention. Because engine 12 is a two horsepower engine, it is relatively small. Nevertheless, engine 12 is secured to frame 11 between front and rear ends 16 and 17 beneath seat 20. Suitable couplings or mounts are employed in the attachment of engine 12 to frame 11. Engine 12 incorporates an ignition that is capable of turning engine 120N. The ignition constitutes a "pull-type" ignition or one in which a key or switch is employed, such as with an electrically powered ignition. Any suitable ignition assembly or switch capable of starting engine 12 can be used.

Engine 12 includes a drive element 30, which is driven by engine 12 for rotation. A drive gear assembly 31 is secured and rotated to frame 11. A pair of differently sized fixed gears 31A, 31B characterize gear assembly 31. Gear 31A is larger than gear 31B and this can be reversed. Gears 31A, 31B can be similarly sized if desired. Gear 32A is larger than gear 32B and this can be reversed. Gears 32A, 32B can be similarly sized if desired. Variously sized fixed gears characterize gear assembly 33 in a conventional manner, as does the derailer mentioned earlier, which are features common to most currently-available mountain bikes, further details of which will readily occur to the skilled artisan. An endless chain or belt 34 meshingly interacts with drive element 30 and gear 31A, an endless chain or belt 35 meshingly interacts with gear 31B and gear 32B, and endless chain or belt 36 meshingly interacts with gear 32A and gear assembly 33.

Clutch 15 connects and disconnects drive element 30 to gear 31A via endless belt 34. When endless belt 34 connects drive element 30 to gear 31A, rotational power is transferred from drive element 30 to cog assembly 33 causing rear wheel 19 to rotate, which facilitates powered wheeled movement of vehicle 10. In particular, when endless belt 34 connects drive element 30 to gear 31A, rotational power provided by drive element 30 is transferred to gear 31A rotating it, in which rotational power is then transferred via endless belt 35 from gear 31B to gear 32A, then in which rotational power is transferred via endless belt 36 from gear 32A to cog assembly 33.

A jointed lever 40 and an attached rotated idler 41 characterize clutch 15. In this embodiment, idler 41 is attached to engine 12, although it can be attached elsewhere, such as to frame 11. Lever 40 is attached to and interacts with idler 41, and extends upwardly therefrom to a handle 42. By grasping and acting on handle 42, lever is capable of being pivoted. In response to pivotal movement of jointed lever 40, idler 41 is movable between a first position away from endless belt 34 and a second position against endless belt 34. In the second position of idler 41, endless belt 34 is placed under tension tightening it into meshing or working engagement with drive element 30 connecting drive element 30 to gear 31A via endless belt 34 permitting rotational power to transfer from drive element 30 to gear 31A via endless belt 34. In the first position of lever 40, idler 41 is disposed away from endless belt 34 relieving tension therefrom taking endless belt 34 out of meshing or working engagement with drive element 30 disconnecting drive element 30 from gear 31A. As seen in FIGS. 1 and 3, lever 40 interacts with a fixture 43 attached to frame 11 between its front and rear ends 16, 17. A male engagement feature 45 (FIG. 3) carried by lever 40 is capable of interlocking with female engagement features 44 locking it in place in its first and second positions and at various positions therebetween. The positioning of the male and female engagement features can be reversed, if desired.

Throttle 14 controls the power output of engine 12. As seen in FIGS. 1–4, an attached levered element 50 that connects to and interacts with a valve of engine 12 controls the amount of fuel delivered to engine 12, which controls the power output (e.g., speed) of engine 12. Levered element 50 is attached to a stem 51 of frame 11 that connects handlebars 21, and yet it can be attached elsewhere. Other throttle forms can be used with the invention. Rather than a levered element, the manually adjustable feature for governing the speed of engine 12 can be any suitable movable feature and even a rotating handled element, and personal preference will normally dictate the desired type or form of movable feature.

In sum, vehicle 10 is essentially a converted mountain bike, in which the pedaled crankshafts are removed in favor of the attachment of engine 12, drive gear assembly 31, throttle 14 and clutch 15, and the association between drive gear assembly 31 and chain ring assembly 32 via endless belt 35 for facilitating power transfer from engine 12 to cog assembly 33 via endless belt 36. Vehicle 10 is capable of being ridden by sitting up seat 20 and maneuvered with handlebars 21. A rider of vehicle 10 can place his feet upon foot rests 60, 61 (FIGS. 1–3) secured to frame 11 forward of chain ring assembly 32 and rearward of front wheel 18 for comfort. By turning engine 12 ON and operating throttle 14 and clutch 15, vehicle is capable of being driven from place to place, representing a highly efficient means of local transportation. Furthermore, vehicle 10 can be operated at different speeds by controlling the operation of throttle 14 for controlling the output of engine 12. Speed and gearing ratios can also be varied by shifting between the gears of cog assembly 33 with rear derailer 22 via shift lever assembly 23. Although chain ring assembly 32 as two gears 32A, 32B, it can incorporate more, if desired. In this environment, vehicle 10 can incorporate a front derailer for gear assembly 32, if desired, for providing a user with the ability to move between one or more available gear not occupied by belt 35. A derailer can also be incorporated with cog assembly 31, if desired. Those of ordinary skill will appreciate that a derailer is a device operable for switching between variously sized gears. In this respect, it will be evident that the various gear assemblies of vehicle 10 can and preferably will incorporate variously sized gears and associated and operable derailers, permitting the gearing range of vehicle 10 to be adjusted as desired during use.

The present invention is described above with reference to a preferred embodiment. However, those skilled in the art will recognize that changes and modifications may be made to the invention without departing from the nature and scope thereof. For instance, rather than an internal combustion engine, an electrically powered engine can be used, if desired. In the case of an electric motor, it is to be understood that a suitable throttle will incorporate a rheostat or other similar device for controlling the amount of electrical power output of the electric engine. Any suitable throttle capable of governing the output of such an electrically powered motor can be used without limitation. Various other changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A vehicle comprising:
   a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly;
   an engine attached to the frame between the front fork and rear forks, the engine having a drive element;
   a drive gear assembly attached to the frame;
   a second endless chain coupling the drive element to the drive gear assembly; and
   a third endless chain coupling the drive gear assembly to the chain ring assembly.

2. The vehicle of claim 1, further comprising:
   a rear derailer attached to the frame and associated with the cog assembly and the first endless chain; and
   a shift lever assembly attached to the frame and coupled to the rear derailer for adjusting the rear derailer for moving the first endless chain between gears of the cog assembly.

3. The vehicle of claim 1, the engine having a power output, further comprising a throttle for controlling the power output of the engine.

4. A vehicle comprising:
   a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly;
   a rear derailer attached to the frame and associated with the rear cog assembly and the first endless chain;
   a shift lever assembly attached to the frame and coupled to the rear derailer for adjusting the rear derailer for moving the first endless chain between gears of the cog assembly;
   an engine attached to the frame between the front fork and rear forks, the engine having a drive element;
   a drive gear assembly attached to the frame;
   a second endless chain coupling the drive element to the drive gear assembly; and
   a third endless chain coupling the drive gear assembly to the chain ring assembly.

5. The vehicle of claim 4, the engine having a power output, further comprising a throttle for controlling the power output of the engine.

6. A vehicle comprising:
   a bike frame having front and rear forks, a front wheel attached to the front fork, a rear wheel attached to the rear fork, and a drive train including a crank attached to the frame, a chain ring assembly attached to the crank, a cog assembly attached to the rear wheel, and a first endless chain coupling the chain ring assembly to the cog assembly;
   an engine attached to the frame between the front fork and rear forks, the engine having a drive element and a power output;
   a drive gear assembly attached to the frame;
   a second endless chain coupling the drive element to the drive gear assembly;
   a third endless chain coupling the drive gear assembly to the chain ring assembly; and
   a throttle for controlling the power output of the engine.

7. The vehicle of claim 6, further comprising:
   a rear derailer attached to the frame and associated with the cog assembly and the first endless chain; and
   a shift lever assembly attached to the frame and coupled to the rear derailer for adjusting the rear derailer for moving the first endless chain between gears of the cog assembly.

* * * * *